United States Patent
Yan et al.

(10) Patent No.: US 10,382,588 B2
(45) Date of Patent: Aug. 13, 2019

(54) RESOURCE ACCESS DRIVEN DISTRIBUTED TRANSACTION COORDINATION SYSTEM

(71) Applicant: ELECTRONIC ARTS INC., Redwood City, CA (US)

(72) Inventors: Lin Yan, Redwood City, CA (US); Zhaoquan Zheng, Fremont, CA (US); Shengyong Li, Redwood City, CA (US); Chuan Ye, San Bruno, CA (US); Daniel Windrem, Redwood City, CA (US); Ryan Thomas Butterfoss, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 691 days.

(21) Appl. No.: 14/320,044

(22) Filed: Jun. 30, 2014

(65) Prior Publication Data
US 2015/0381516 A1    Dec. 31, 2015

(51) Int. Cl.
*H04L 29/06* (2006.01)
*H04L 29/08* (2006.01)
*H04L 12/721* (2013.01)
*H04L 12/911* (2013.01)
*G06F 9/48* (2006.01)
*G06F 9/445* (2018.01)

(52) U.S. Cl.
CPC ............ *H04L 67/42* (2013.01); *G06F 9/4451* (2013.01); *G06F 9/4856* (2013.01); *H04L 45/566* (2013.01); *H04L 67/10* (2013.01); *H04L 67/1097* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 6,499,031 B1 * | 12/2002 | Hopmann | ........... | G06F 21/6218 |
| 6,701,345 B1 * | 3/2004 | Carley | .............. | G06F 17/30368 707/999.008 |
| 8,615,768 B2 * | 12/2013 | Kwan | ....................... | G06F 8/71 707/610 |
| 8,663,004 B1 * | 3/2014 | Xu | .......................... | A63F 13/12 463/20 |
| 8,954,985 B2 * | 2/2015 | Edelstein | .............. | G06F 9/4881 712/216 |
| 9,396,219 B2 * | 7/2016 | Smith | ................... | G06F 17/303 |

(Continued)

OTHER PUBLICATIONS

"Microsoft Distributed Transaction Coordinator" download from http://en.wikipedia.org/wiki/Microsft_Distributed_Transaction_Coordinator, May 22, 2014. 3 pages.

*Primary Examiner* — Lewis A Bullock, Jr.
*Assistant Examiner* — Bruce S Ashley
(74) *Attorney, Agent, or Firm* — Lowenstein Sandler LLP

(57) ABSTRACT

Resource access driven distributed transaction coordination system is described. A method may include receiving a request to perform a migration of user data from a first user account to a second user account and restricting access to a distributed resource as a result of receiving the request. When a distributed process requests access to a distributed resource, and that distributed process doesn't have any pending tasks, account migration may be performed.

17 Claims, 9 Drawing Sheets

(56) References Cited

U.S. PATENT DOCUMENTS

2011/0077086 A1* 3/2011 Grube .................... A63F 13/12
                                                                463/42
2013/0339228 A1* 12/2013 Shuster ................. G06F 9/541
                                                                705/40

* cited by examiner

RESOURCE ACCESS DRIVEN DISTRIBUTED TRANSACTION COORDINATION SYSTEM

TECHNICAL FIELD

This disclosure relates to the field of distributed transactions and, in particular, to resource access driven distributed transaction coordination systems.

BACKGROUND

A common scenario occurs in account migration: A user has been playing a video game and upgrades from an anonymous account to a user-identified account. He needs all his data from various game and platform components to move to the new account. The challenge is that each component typically has its own procedures for account migration and thus ensuring that each migration process is completed, consistent, and error tolerant is difficult.

Existing coordination systems feature a "fat" centralized coordinator, where the centralized coordinator has to track and monitor many different aspects of a distributed transaction. In this type of system, completion status, dependencies, pre-conditions, and other details of every process in the transaction have to be carefully monitored by the centralized coordinator to ensure the transaction is successfully carried to completion. Transactions are carried out on a periodical basis via scheduled tasks defined by the centralized coordinator. The protocol for this system is complicated and inefficient, and the centralized coordinator itself is costly to implement and maintain. Microsoft Distributed Transaction Coordinator® (DTC) is one implementation of this system.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
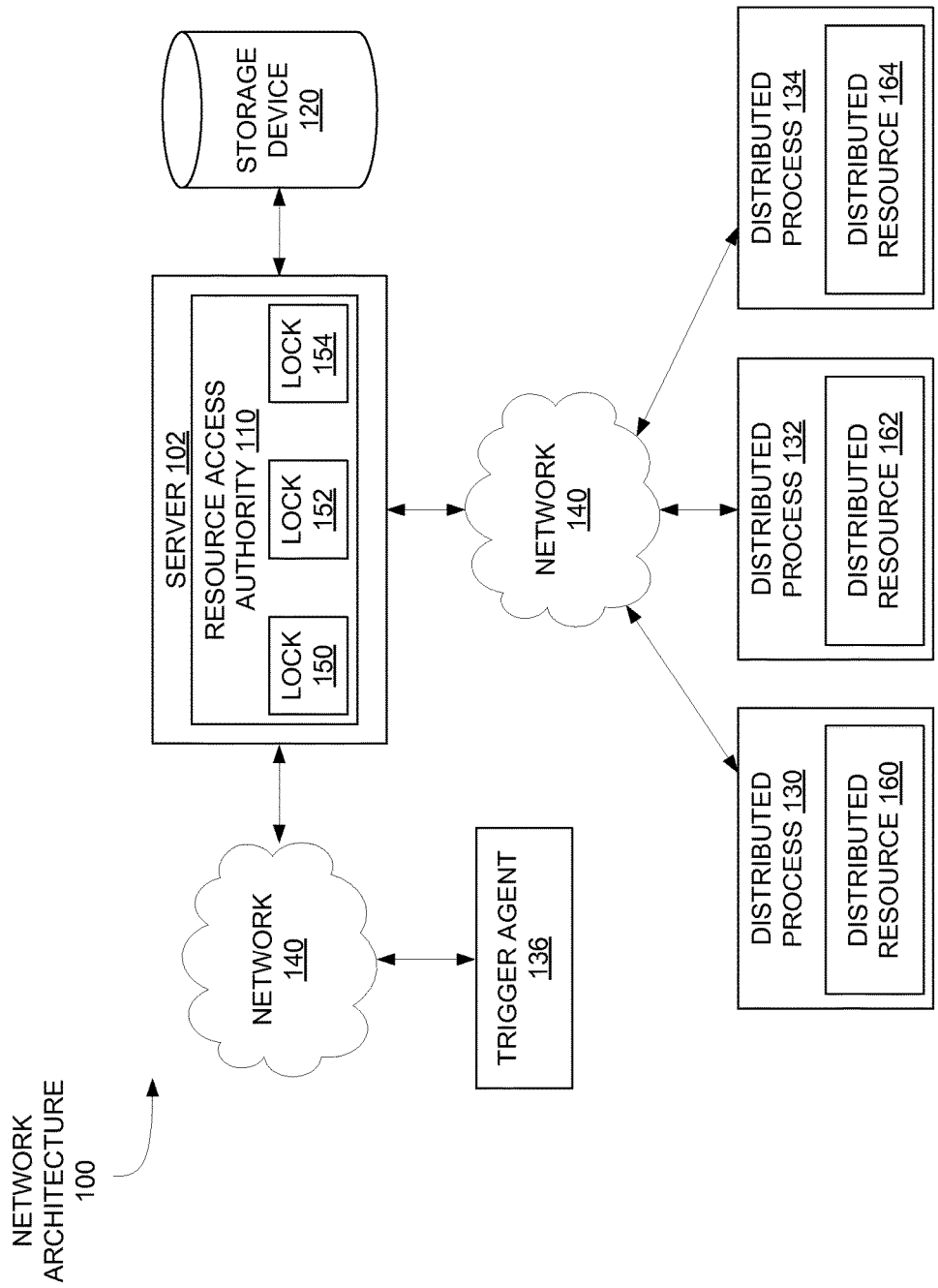
FIG. 1 is a block diagram illustrating an exemplary network architecture in which embodiments of the present disclosure may be implemented.

Embodiments are described for a resource access driven distributive transaction system. In an illustrative embodiment, a user of a video game submits a request to upgrade his account from an anonymous account to a user-identified account. This request serves as a trigger to a resource access authority 110, which is responsible for overseeing the migration through its use of locks 150, 152, 154. After the resource access authority 110 receives the migration request it locks (prevents access to) all distributed resources 160, 162, 164 so as to prevent distributed processes 130, 132, 134 from accessing distributed resources 160, 162, 164 until pending migration tasks have been completed.

In one embodiment, when a distributed process 130 submits a request to access a distributed resource 160, the resource access authority 110 may deny the request because the distributed process 130 has not yet completed a task necessary to carry out the migration of user data 230. The distributed process 130 receives an error from the resource access authority 110 notifying it that the requested distributed resource 160 is locked due to a task that is currently pending for the distributed process 130. The distributed process 130 then carries out the required task. Distributed processes 130, 132, 134 are able to carry out tasks without assistance from the resource access authority. They are able to communicate with other distributed tasks 130, 132, 134 directly and thus do not require the resource access authority to act as a middleman.

Once a distributed process 130 has completed a required task, the distributed process 130 may again request access to the distributed resource 160 from the resource access authority 110. The resource access authority 110 may then verify that the distributed process 130 has completed the pending task and grant access to the distributed resource 160. This process may be repeated for several distributed processes 130, 132, 134 until the migration is complete.

Embodiments of the present disclosure allow for the migration of user data 230 to be carried out asynchronously (resource access driven), allowing for the migration to require less system resources at one time. This is achieved by performing individual migration tasks when a distributive process 130, 132, 134 requests access to a distributed resource 160. Using this type of resource access driven system, migration tasks are efficiently carried out only when necessary.

While embodiments may be described in relation to certain data and accounts, in alternative embodiments, the methods and apparatus discussed herein may also be used with other types of data and accounts. For example, in alternative embodiments, the methods described herein could be used to migrate user accounts for online forums, stores, and social media applications. It will be appreciated that such a system as presently described has a vast number of data migration implications.

The type of migration management described herein allows a migration of user data to be carried out by a resource access manager, and thus avoid complicated and costly implementation of a centralized server that must track and monitor the low-level details of individual migration processes. Because the resource access manager is not responsible for managing migration protocols and operations distributed processes are allowed to efficiently manage themselves on an as needed basis. Additionally, systems in which user account migration takes place implement a centralized resource storage unit and such systems would be able to effectively utilize a resource access driven distributive transaction system without configuring and managing a separate "fat" centralized coordinator such as the DTC®.

FIG. 1 is a block diagram illustrating an exemplary network architecture in which embodiments of the present disclosure may be implemented. The network architecture 100 may include one or more servers 102 communicating with one or more distributed processes 130, 132, 134, and one or more trigger agents 136, over one or more networks 140, according to one embodiment. Network 140 can be a local area network (LAN), a wireless network, a telephone network, a mobile communications network, a wide area network (WAN), such as the Internet, or similar communication system. Examples of trigger agent as implemented by Electronic Arts include the FIFA mobile client and UFC mobile client.

Distributed processes 130, 132, 134 may be a number of distributed components in a service architecture that each have their own tasks. In one embodiment, such processes 130, 132, 134 manage their own logic and protocols so that they can complete their own tasks without knowing the logic and protocols of other processes. Upon completion, each individual task of a distributed process may be combined to complete a transaction. In one embodiment, distributed processes 130, 132, 134 include distributed resources 160, 162, 164.

Server 102 may include a network-accessible server-based functionality, various data stores, and/or other data processing equipment. The server 102 may be implemented by a single machine or a cluster of machines. Server 102 may include, for example, computer system 700 of FIG. 7. In one embodiment, server 102 includes resource access authority 110. Resource access authority 110 can receive a migration request from triggering agent 136. Upon receiving a migration request from triggering agent 136, resource access authority 110 can restrict access to distributed resources 160, 162, 164 by utilizing one or more locks 150, 152, 154. Resource access authority 110 may receive a request to access a distributed resource 160 by one or more distributed processes 130, 132, 134. Upon receiving such a request, resource access authority 110 may deny distributed processes' 130, 132, 134 request for access if one or more locks 150, 152, 154 are enabled or may grant access if locks 150, 152, 154 are disabled. In one embodiment, resource access authority 110 may send an error message to a distributed process 130 requesting access to distributed resource 160 if the requested distributed resource 160 is locked, notifying the distributed process 130, 132, 134 that a task must be completed before access may be granted.

Server 102 may be one server or it may represent multiple servers. In one embodiment, when a first distributed process 130 connects to server 102 and a second distributed process 132 connects to server 102, server 102 may be the same server that handles both processes' connections. In another embodiment, when a first distributed process 130 connects to server 102 and a second distributed process 132 connects to server 102, server 102 may represent different servers, so that each distributed process connects to a different server.

In one embodiment, storage device 120 includes data store 222, in which may include user data 230 and a distributed resource check table 234. In another embodiment, user data 230 and/or distributed resource check table 234 are stored elsewhere, outside of data store 222 or storage device 120. In one embodiment, user data 230 may include distributed resource check table 234.

In response to a migration request from triggering agent 136, resource access manager 110 can enable locks 150, 152, 154 by flagging corresponding entries in distributed resource check table 234 residing data store 222. An example of distributed resource check table 234 as implemented by Electronic Arts is the Nucleus® Check Table. Resource access authority 110 may maintain a check table 234 for every registered component in the migration process. In one example, each row of check table 234 may record the status of whether a given component has finished the migration for a given user. In another example, some other data structure may be used to store the status of component migration. Check table 234 may utilize several status indicators such as "not started," "completed" and "in progress." In one implementation a "failed" status indicator may be used to indicate that a migration has failed.

In one embodiment, server 102 may include resource access authority 110 and storage device 120. In another embodiment, storage device 120 may be external to server 102 and may be connected to server 102 over a network or other connection. In other embodiments, server 102 may include different and/or additional components which are not shown here so as not to obscure the present disclosure. Storage device 120 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

Figure 2:
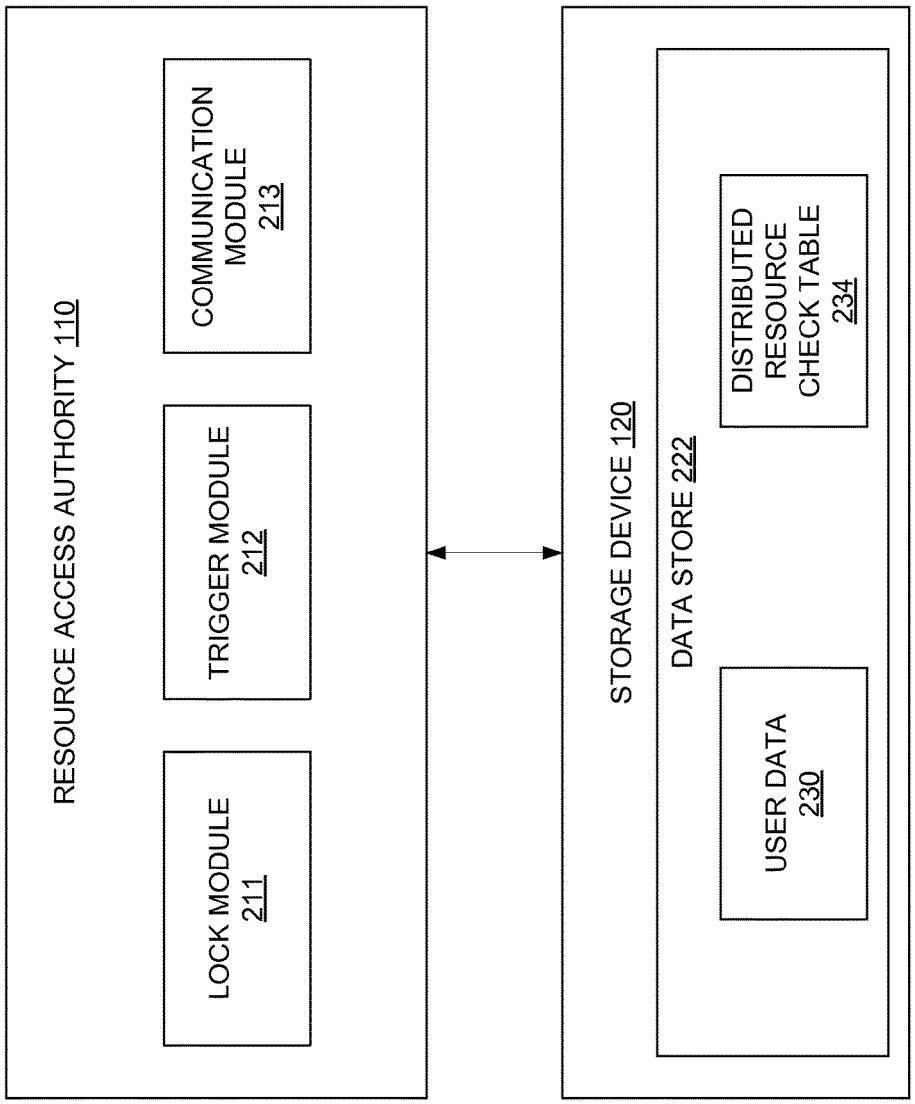
FIG. 2 is a block diagram illustrating a resource access authority unit, according to an implementation.

FIG. 2 is a block diagram illustrating a resource access authority 110, according to an implementation of the present disclosure. In one embodiment, resource access authority 110 may include lock module 211, trigger module 212, and communication module 213. This arrangement of modules may be a logical separation, and in other embodiments, these modules or other components can be combined together or separated in further components, according to a particular embodiment. In one embodiment, storage device 120 may include data store 222. In one embodiment, resource access authority 110 maintains data store 222. Resource access authority 110 can receive a migration request from trigger agent 136 and subsequently initiate a lockdown of distributed resources 160, 162, 164. Using input from data store 222, the various modules of resource access authority 110 can automatically perform migration of data by restricting access to distributed resources 160, 162, 164 until distributed processes 130, 132, 134 have completed pending tasks.

In one embodiment, lock module 211, trigger module 212, and communication module 213 are used to perform a migration of user data 230 located in data store 222. Data store 222 may store, for example, profile information about a user, game-specific information, and user preferences. In one embodiment, data store 222 may include a distributed resource check table 234 for use in restricting access to distributed resources 160, 162, 164. Distributed resource check table 234 may be a table containing binary flags for each distributed resource 160, 162, 164. In one embodiment, if a flag is set, access to the corresponding distributed resource 160, 162, 164 should be restricted and if the flag is cleared, access should be granted to that distributed resource 160, 162, 164. In another embodiment the opposite may be true. In yet another embodiment, distributed resource check table 234 utilizes a different storage structure other than a check table.

When resource access authority 110 receives a migration request from trigger agent 136 via trigger module 212, lock module 211 may initiate a lockdown of all distributed resources 160, 162, 164 by activating all locks 150, 152, and 154. In another embodiment, lock module 211 may restrict access to individual distributed resources 160, 162, 164. In one embodiment, each lock 150, 152, 154 is assigned to a separate distributed resource 160, 162, 164 and thus access to a single distributed resource 160 may be granted or restricted individually, without granting or restricting access to any other distributed resource 162, 164. In another embodiment, lock 150 may control access to a group of distributed resources 160, 162, 164.

In one embodiment, a migration may need to be performed for a component service that does not require any access to distributed resources 160, 162, 164. In this case, artificial (empty) distributed resources 160, 162, 164 may be created and then assigned to distributed processes 130, 132, 134 in order to create a dependency on distributed resources 160, 162, 164. In this way, distributed processes 130, 134, 136 without tasks that depend on access to distributed resource 160, 162, 164 may still be regulated by resource access authority 110 and lock module 211.

After a lockdown of distributed resources 160, 162, 164 has occurred, resource access authority 110 may receive a request from a distributed process 130 for a distributed resource 160. Upon such a request, lock module 211 may consult distributed resource check table 234 in data store 222 for a status of the lock 150 on the distributed resource 160. If check table 234 indicates that access to distributed resource 160 is not currently being restricted, lock module 211 may grant access to distributed resource 160 by distributed process 130.

In another embodiment, if check table 234 indicates that access to distributed resource 160 is currently being restricted, lock module 211 may deny access to the distributed resource 160 by distributed process 130. In this case, lock module 211 may employ communication module 213 to send a message regarding the status of distributed resource 160 to the distributed process 130. Lock module 211 may receive the status of distributed resources 160, 162, 164 from check table 234 in the form of a list, table, or other data structure. In another embodiment, lock module 211 may receive distributed resource 160, 162, 164 status directly from system administrators.

In some cases an individual distributive process' 130 task or an entire migration may be time sensitive. In this situation and others, lock module 211 may implement a timed monitor to periodically check the status of distributed resources 160, 162, 164 to ensure that a lock is not in an enabled state for too long. The timed monitor may also be configured to send an alert via the communication module 213 to an external troubleshooting module so that an operation resource can help determine the problem. Trigger agent 136 may also be configured to periodically trigger a migration process by sending a message to resource authority 110 so that migration tasks may be completed in a timely manner. In one embodiment communications module 213 handles the sending of this message.

Trigger module 212 may receive a request from trigger agent 136 and notify lock module 211 of the request. Lock module may then restrict access to distributed resources 160, 162, 164 using locks 150, 152, 154. In one example distributed processes 130, 132, 134 are time-critical. In these situations trigger module 212 may be configured to schedule the triggering of a migration request or individual distributive process 130.

Communication module 213 may handle the communication between trigger agent 136, lock module 211, trigger module 212, resource authority 110, and distributed processes 130, 132, 134. In one embodiment, after a distributed process 130 requests access to a distributed resource 160, communication module 213 may send a notification to a distributive process 130 indicating that the distributed resource 160 is currently locked. Communication module 213 may provide distributive process 130 with information regarding a task that must be completed before access to distributed resource 160 may be granted. In another embodiment, communication module 213 may provide troubleshooting information for a distributive process 130 that is lagging in its tasks. In another embodiment, communication module 213 may send troubleshooting information about a lock 150 that has been enabled for a time period greater than a threshold amount of time.

Figure 3:
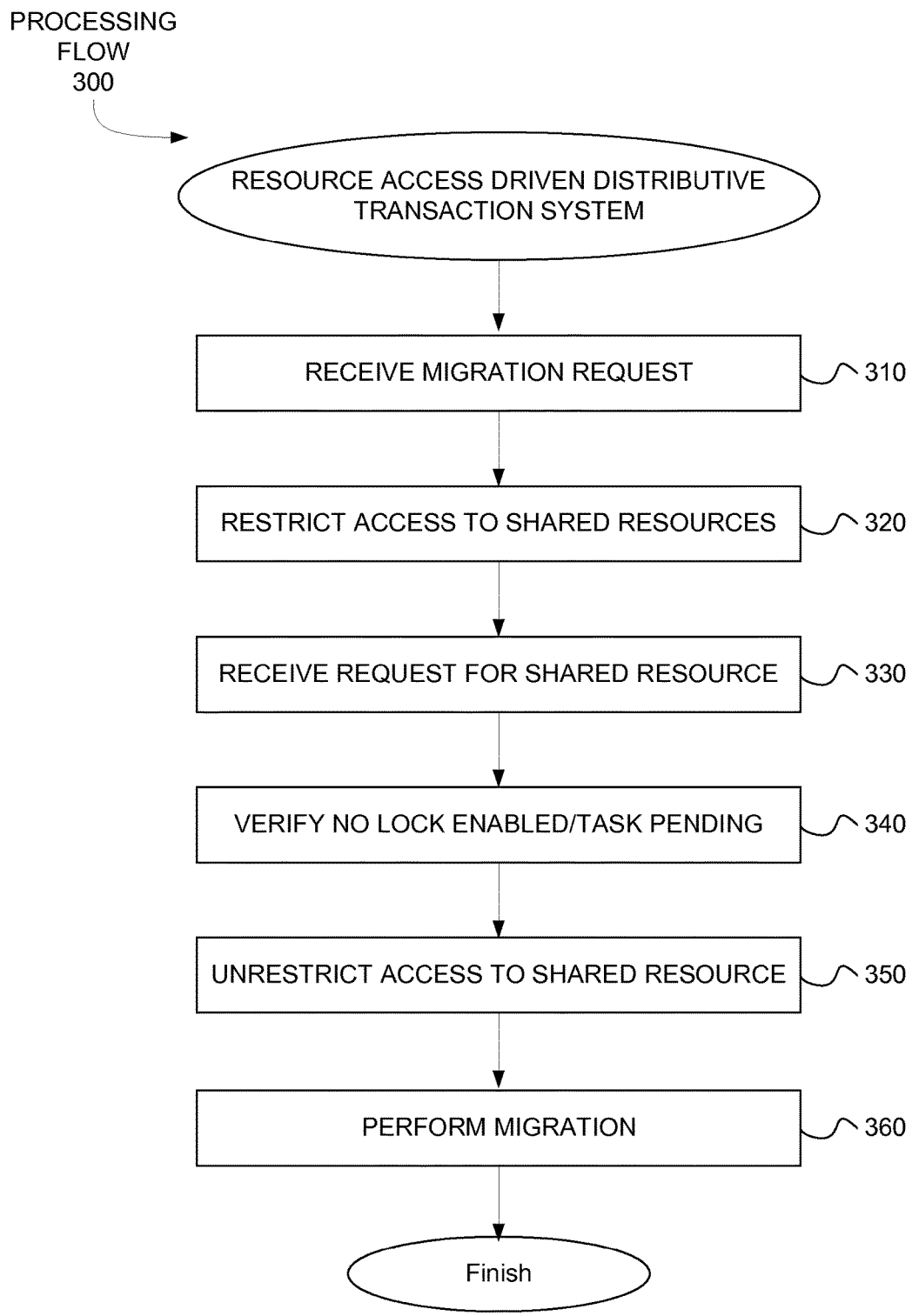
FIG. 3 is a flow diagram illustrating a resource access driven distributive transaction system processing flow, according to an implementation.

FIG. 3 is a flow diagram illustrating a resource access driven distributive transaction system processing flow, according to an implementation of the present disclosure. The processing flow method 300 may be performed by processing logic that comprises hardware (e.g., circuitry, dedicated logic, programmable logic, microcode, etc.), software (e.g., instructions run on a processing device to perform hardware simulation), or a combination thereof. Method 300 can perform an asynchronous account migration by restricting access to distributed resources 160, 162, 164. In one embodiment, resource access authority 110 may perform method 300. Method 300 may be performed in any order so as to fit the needs of the specific migration to be accomplished.

Referring to FIG. 3, at block 310, method 300 receives a request to migrate user data from an anonymous user video game account to a user-identified video game account. The migration request may be sent by trigger agent 136 and handled by trigger module 212. In one embodiment, trigger agent 136 may send a migration request from outside resource access authority 110 and server 102. An example of such an external request may be a video game user or account holder initiating the migration request by performing an action such as clicking on a button inside a gaming platform to indicate that he would like to upgrade his account. Another example of an external request may be a user performing actions on a website indicating his intent to migrate user data to a different account.

In another embodiment, the migration request may be received from an internal process, as in the case of time-sensitive migration requests discussed above. Internal migration requests may be sent by applications across one or more servers 102. An example where such a request would be useful is in the case where a user has created two different accounts, and performs some action by the trigger agent 136 that indicates his intent to consolidate and migrate accounts. Using an internal trigger, the second account may be consolidated with the user's other account, and migrated to the user's new account. The first external trigger would initiate the migration of the first account as well as activate a second trigger to consolidate and migrate the user's second account. In one embodiment, when a user requests that a series of migration accounts from several anonymous accounts to a user-identified account, resource access authority 110 may perform the migration in a chronological order. In another embodiment, the migration may be performed according to first-in-first-out, first-in-last-out, or some other protocol.

At block 320, locks 150, 152, 154 are enabled so that access is restricted to distributed resources 160, 162, 164. In one embodiment, locks 150, 152, 154 are enabled by lock module 211. After receiving a migration request, locks 150, 152, 154 may be enabled for all distributed resources 160, 162, 164. In another embodiment, only a portion of locks 150, 152, 154 are enabled for only a portion of distributed resources 160, 162, 164.

At block 330, resource access authority 110 receives a request to access a distributed resource 160 by a distributed process 130. At block 340, resource authority 110 consults distributed resource check table 234 to verify that a lock 150 is not enabled for the distributed resource 160 that was requested by the distributed process 130 or alternatively that the distributed process 130 does not have any pending migration tasks. Locks 150, 152, 154 may be enabled when a task is pending for a distributed process 130, 132, 134 and disabled when the pending task is completed. Locks 150, 152, 154 may also be disabled when a requesting distributed process 130, 132, 134 does not have any queued migration tasks to perform. In one embodiment, lock module 211 carries out the verification and locking/unlocking process. In another embodiment, trigger module 212, communication module 213, or some other module within or outside resource access authority 110 may carry out the process. At blocks 350 and 360, once the verification process ends successfully, access to distributed resource 160 by distributed process 130 is granted by disabling lock 150 and migration is performed.

Figure 4:
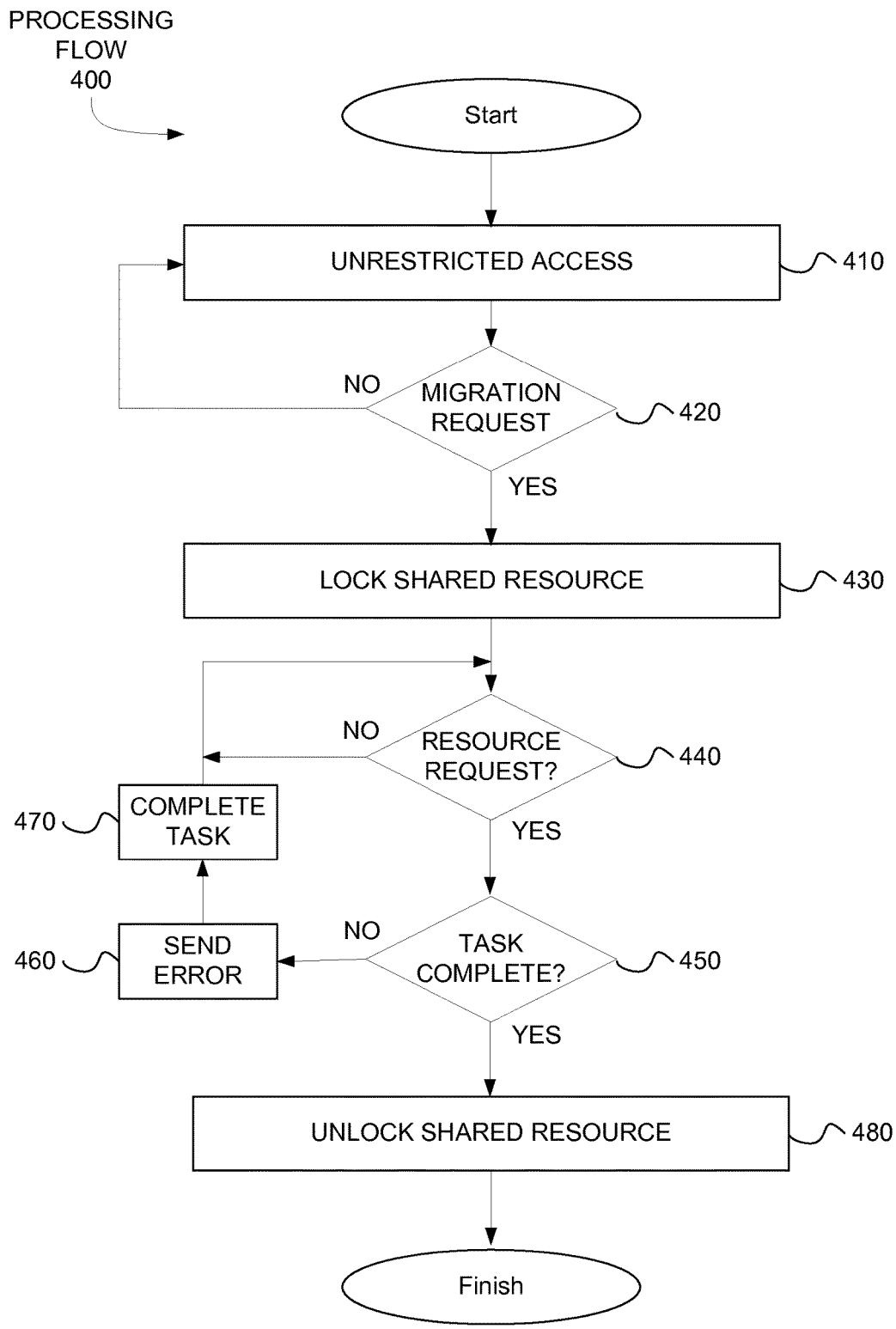
FIG. 4 is a flow diagram illustrating a communication protocol for a resource access driven distributive transaction system, according to an implementation.

FIG. 4 is a flow diagram illustrating a communication protocol for a resource access driven distributive transaction system, according to an implementation of the present disclosure. One example of a communication protocol that is used by Electronic Arts is the Authentication Driven Migration (ADM) protocol. The processing flow method 400 may be performed by processing logic that comprises hardware (e.g., circuitry, dedicated logic, programmable logic, microcode, etc.), software (e.g., instructions run on a processing device to perform hardware simulation), or a combination thereof. Method 400 can perform an asynchronous account migration by restricting access to distributed resources 160, 162, 164. In one embodiment, resource access authority 110 may perform method 400. Method 400 may be performed in any order so as to fit the needs of the specific migration to be accomplished.

Referring to FIG. 4, at block 410, method 400 is in a state that allows complete access to distributed resources 160, 162, 164. In this state, locks 150, 152, 154 are disabled and thus distributed processes 130, 132, 134 are allowed to access distributed resources 160, 162, 164 freely. In one embodiment, distributed resource check table 234 records flags indicating the disabled status of locks 130, 132, 134. At block 420, resource access authority 110 determines whether or not a request to migrate account data has been received from trigger agent 136. In one embodiment, trigger module 212 makes this determination. If a request has not been received, processing flow loops back to block 410 where locks 150, 152, 154 are still in a disabled state and each distributed process 130, 132, 134 continues to enjoy unrestricted access to distributed resources 160, 162, 164.

If the resource access authority 110 determines at block 420 that a migration request has been received from trigger agent 136, locks 150, 152, 154 are enabled for distributed resources 160, 162, 164 at block 430 and thus access to distributed resources 160, 162, 164 is restricted. Locks 150, 152, 154 may be enabled by adding flags to distributed resource check table 234 to indicate that access to a distributed resource 160, 162, 164 should be blocked for all or a portion of distributed processes 130, 132, 134. At block 440, if no distributed process 130, 132, 134 requests access to a distributed resource 160, 162, 164, processing flow loops back to a waiting state where locks 150, 152, 154 are enabled and therefore access to distributed resources 160, 162, 164 is restricted.

At block 440, once a distributed process 130 requests access to a distributed resource 160, resource access authority 110 determines whether or not the distributed process 130 has a pending task that has not yet been completed. If so, an error message may be sent to the distributive process 130, a user, system administrator, or error log to indicate the reason the distributive process 130 was blocked from accessing distributed resource 160. In one embodiment, communication module 213 handles the sending of error messages. At block 470 the blocked distributive process 130 performs the required task.

Processing flow again arrives at block 440, and distributive process 130 requests access to distributed resource 160. In one embodiment, distributive process 130 may not immediately request access to distributed resource 160 after completing the required task. In this case, access to distributed resource 160 by distributive process 130 remains locked until processing flow continues. In another embodiment, distributive process 130 has completed the task required of it and again requests access to distributed resource 160 at block 440. The necessary task has been completed at block 450 and therefore the requested distributed resource 160 is unlocked at block 480. In one embodiment, a flag in distributed resource check table 234 may be cleared to indicate that a lock 150, 152, 154 should be disabled to allow unrestricted access to distributed resource 160.

In the chance that a distributed process 130, 132, 134 may fail, a per-process triggering agent may be implemented. In this case, each distributed process 130, 132, 134 may have a trigger agent 136 that repeatedly sends a request to the service as needed. An example of this would be as follows: If a distributed process 130, 132, 134 fails, trigger agent 136 may send another request to revive the process. Distributed process 130, 132, 134 may receive an error message if the task is still pending and thus retry completing the task. This retry protocol is also useful for the case of cross-component dependencies. When a first distributed process 130 depends on a second distribute process 132 to complete its task before the first 130 can carry out its own, the retry protocol ensures that distributed processes 130 and 132 don't remain in a stagnant state. The first distributed process' 130 task will continue to fail and retry until the second distributed process 132 completes its task.

When a distributed process 130, 132, 134 fails, resource access authority 110 may protect its own data and handle the retry so that duplicate data is not created. Additionally, in the case that a second migration request is sent on behalf of the same user before the first migration as completed, resource access authority 110 may fail the second migration request.

Figure 5A:
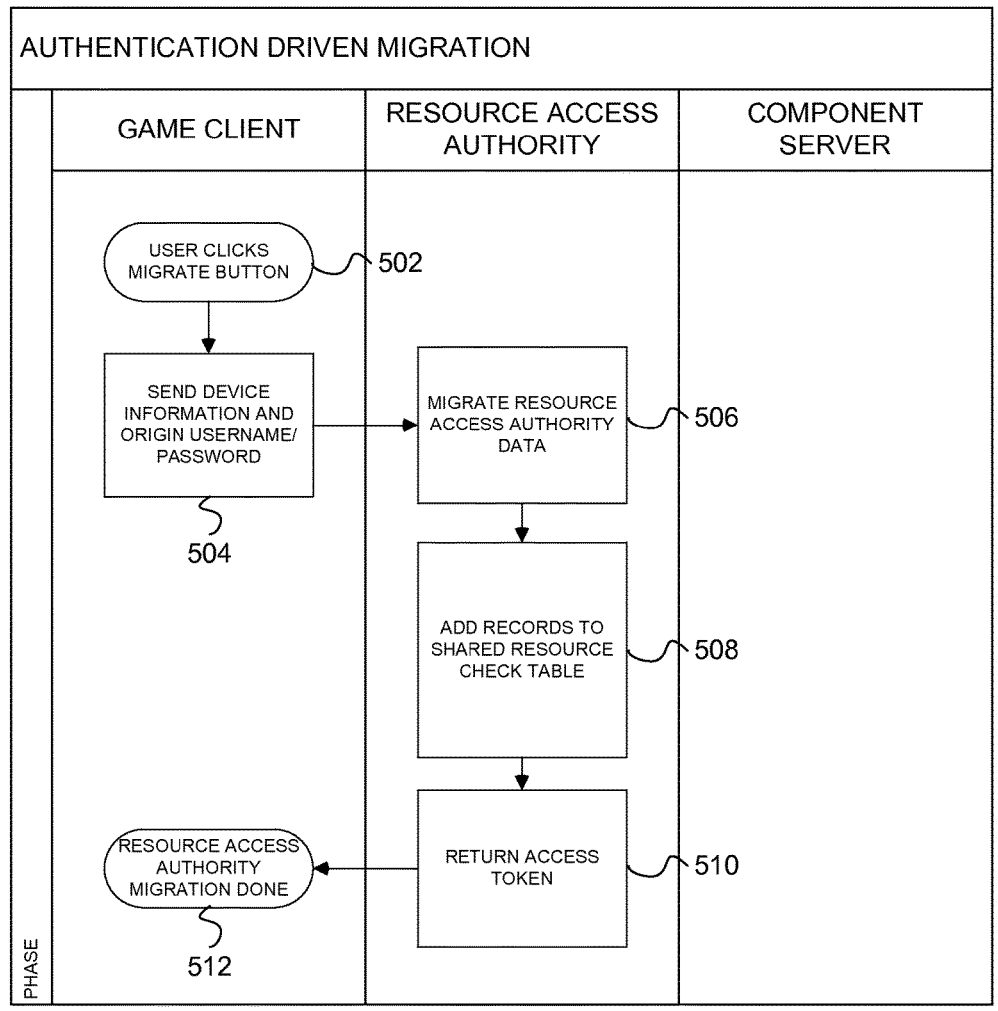
FIG. 5A is the first part of a flow diagram illustrating an example of how a resource access driven distributive transaction system may be employed, according to an implementation.

FIG. 5A is the first part of a flow diagram illustrating an example of how a resource access driven distributive transaction system may be employed, according to an implementation of the present disclosure. The processing flow method 500A may be performed by processing logic that comprises hardware (e.g., circuitry, dedicated logic, programmable logic, microcode, etc.), software (e.g., instructions run on a processing device to perform hardware simulation), or a combination thereof. Method 500A can perform an asynchronous account migration by restricting access to distributed resources 160, 162, 164. In one embodiment, resource access authority 110 may perform method 500A. Method 500A may be performed in any order so as to fit the needs of the specific migration to be accomplished.

As referred to in method 500A, "game client" is a video game console, such as a PlayStation® or Xbox® device, or other computer system that a user is using to connect to a gaming system. Nucleus® is one implementation of resource access authority 110. Another example of a resource authority used by Electronic Arts is the Nexus® system. "Component server" is an implementation of a component service that needs to perform an individual account migration through distributed processes 130, 132, 134. Specific examples of distributed processes 130, 132, 134 implemented by Electronic Arts are Blaze®, FUT®, and the UFC® victory server. The component server, just like all other servers referenced herein, may be one server or a group of more than one server.

Referring to FIG. 5A, at block 502, a video game user clicks a button (or performs some other action) to indicate his intent to migrate his user data 230 from an anonymous account to a user-identified account. This action by the user is an example of a request to migrate account data and such a request may be performed by trigger agent 136. In one embodiment, this request may be handled by trigger module 212 of resource access authority 110. In one embodiment, a user may select from migration preferences. The migration preference may be encoded into a preference parameter that distributed processes 130, 132, 134 understand and it is then passed to resource access authority 110. In one embodiment, resource access authority does not understand the migration preference unless it relates to the migration of resource access authority 110 data. The resource access authority 110 may forward the migration to distributed processes 130, 132, 134. In one embodiment, the migration preference may be encoded as a set of key-value pairs that is passed in by the game client. In other embodiment, some other data structure may be implemented.

In block 504, the user's device information, current username and current password are sent to resource access authority 110. At block 506, resource access authority 110 data, such as a game client identifier and other user data 230, is migrated to a new user-identified account. At block 508, records are added to distributed resource check table 234. In one embodiment, flags are added to distributed resource check table 234 to indicate that locks 150, 152, and 154 should be enabled in order to restrict access to distributed resources 160, 162, 164. A list of migration tasks to be completed may also be added to distributed resource check table 234. In another embodiment, pending migration task information may be stored elsewhere outside of distributed resource check table 234. At block 510, an access token is granted to the game client indicating that step one of the migration process is completed (block 512) and the user is allowed to log in.

Figure 5B:
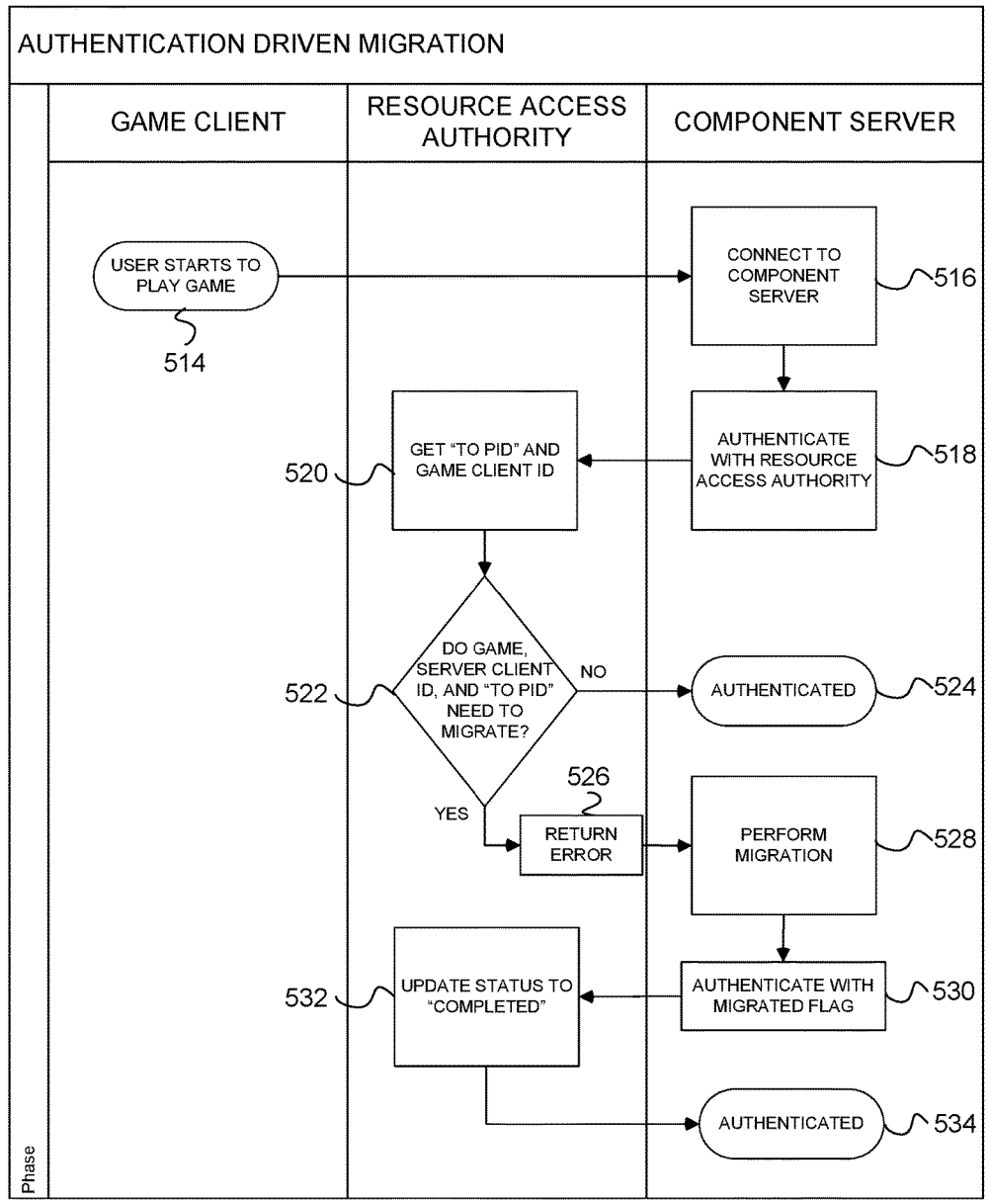
FIG. 5B is the second part of a flow diagram illustrating an example of how a resource access driven distributive transaction system may be employed, according to an implementation.

FIG. 5B is a continuation of the flow diagram in FIG. 5A illustrating an example of how a resource access driven distributive transaction system may be employed, according to an implementation of the present disclosure. The processing flow method 500B may be performed by processing logic that comprises hardware (e.g., circuitry, dedicated logic, programmable logic, microcode, etc.), software (e.g., instructions run on a processing device to perform hardware simulation), or a combination thereof. Method 500B can perform an asynchronous account migration by restricting access to distributed resources 160, 162, 164. In one embodiment, resource access authority 110 may perform method 500B. Method 500B may be performed in any order so as to fit the needs of the specific migration to be accomplished.

Referring to FIG. 5B, at block 514 the video game user begins to play a game on the game client. At block 516, the game client connects to the component server to begin the second step of the migration process. Because the user successfully proceeded through the first step of processing flow 500A, he has already acquired a resource access authority 110 access token that along with the server client identifier allows the component server to authenticate the user in block 518. The player identifier for the new account and game client identifier are acquired by resource access authority 110 from the component server at block 520. Resource access authority 110 consults distributed resource check table 234 to determine if the current game data, server client identifier, and/or new player identifier need to migrate to the new account. If not, processing flow continues to block 524 where the user is authenticated and allowed to continue normal game operation. If migration does need to take place, an error is returned to the component server at block 526. As discussed above, errors may be sent to distributive processes 130, 132, 134, users, system administrators, error logs, or elsewhere. In one embodiment, communication module 213 handles the sending of errors.

At block 528, distributive processes 130, 132, 134 perform required migration tasks according to the methods disclosed above. Once tasks are complete, distributed resource check table 234 is updated to disable locks 150, 152, 154 and allow access to distributed resources 160, 162, 164. As discussed above, the disabling of locks 150, 152, 154 may be done in stages when individual distributed processes 130, 132, 134 complete individual migration tasks and request access to distributed resources 160, 162, 164.

At block 530 the component server is again authenticated with resource access authority 110, this time with a flag indicating that migration has been completed. At block 532 resource access authority 110 updates its records to show that the migration status has been completed and the component server is authenticated now authenticated at block 534. This process may be completed repeatedly for various component services.

Figure 6A:
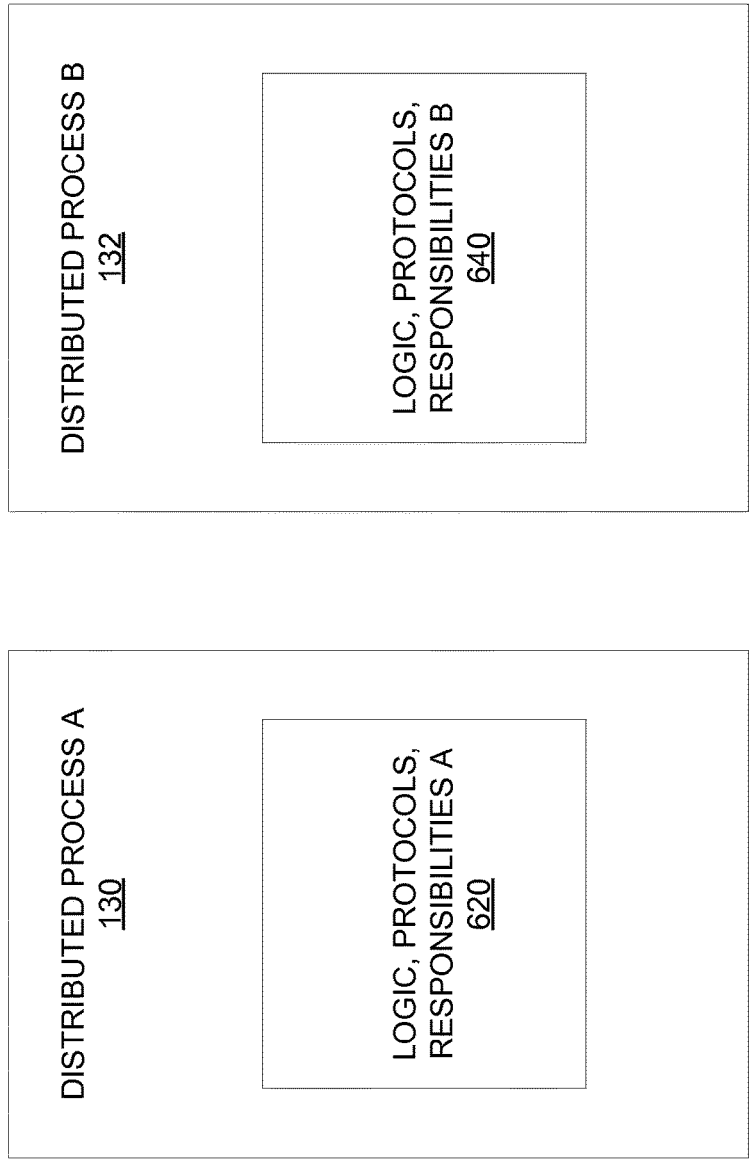
FIG. 6A is a block diagram illustrating a separation between distributed processes, according to an implementation.

FIG. 6A is a block diagram illustrating a separation between distributed processes, according to an implementation of the present disclosure. As illustrated, distributed process A 130 manages its own logic, protocols and responsibilities A 620. Likewise, distributed process B 132 manages its own logic, protocols and responsibilities B 640. In one embodiment, resource access authority 110 knows nothing of logic, protocols or responsibilities A 620 or logic, protocols or responsibilities A 620.

Figure 6B:
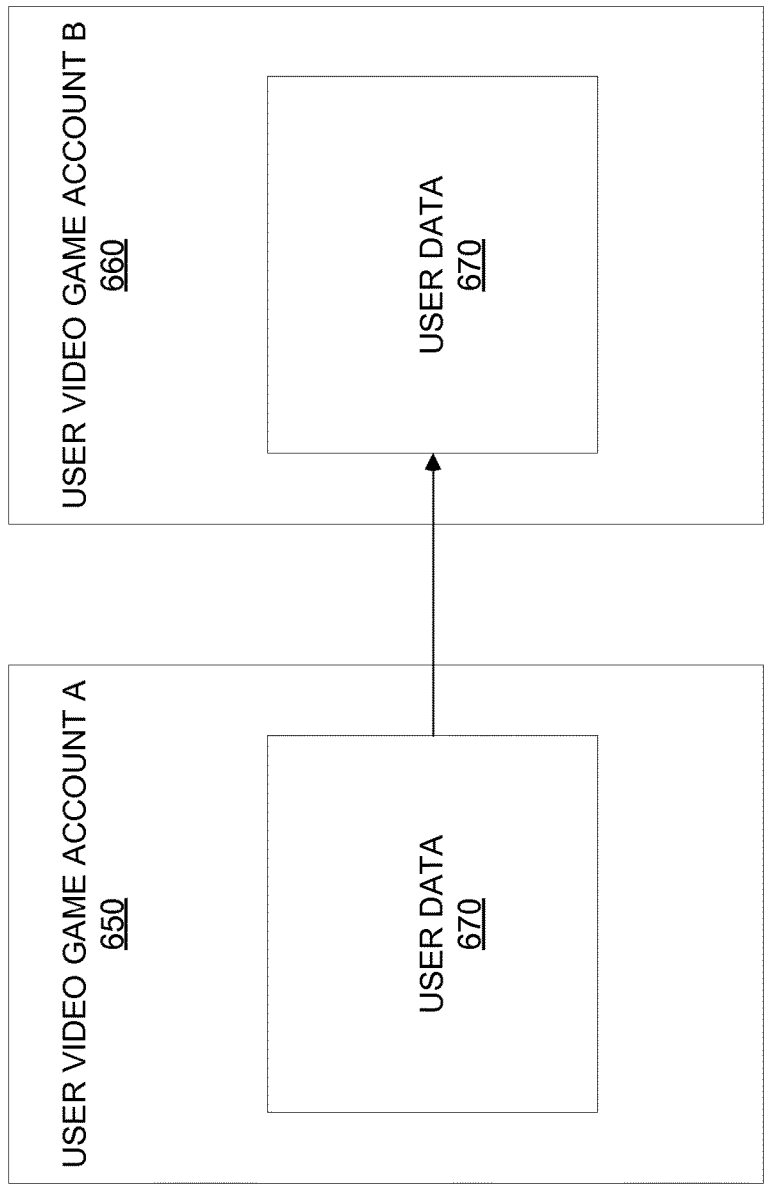
FIG. 6B is a block diagram illustrating a migration of user data from a first user video game account to a second user video game account, according to an implementation of the present disclosure.

FIG. 6B is a block diagram illustrating a migration of user data from a first user video game account to a second user video game account, according to an implementation of the present disclosure. In one embodiment, user video game account A 650 may be an anonymous account. Likewise, user video game account B 660 may be a user-identified account. In another embodiment, user video game account A 650 and user video game account B 660 may both be anonymous accounts, user-identified accounts, or some other type of account. User data 670 may be migrated from a first user video game account A 650 to a second user video game account B 660.

Figure 7:
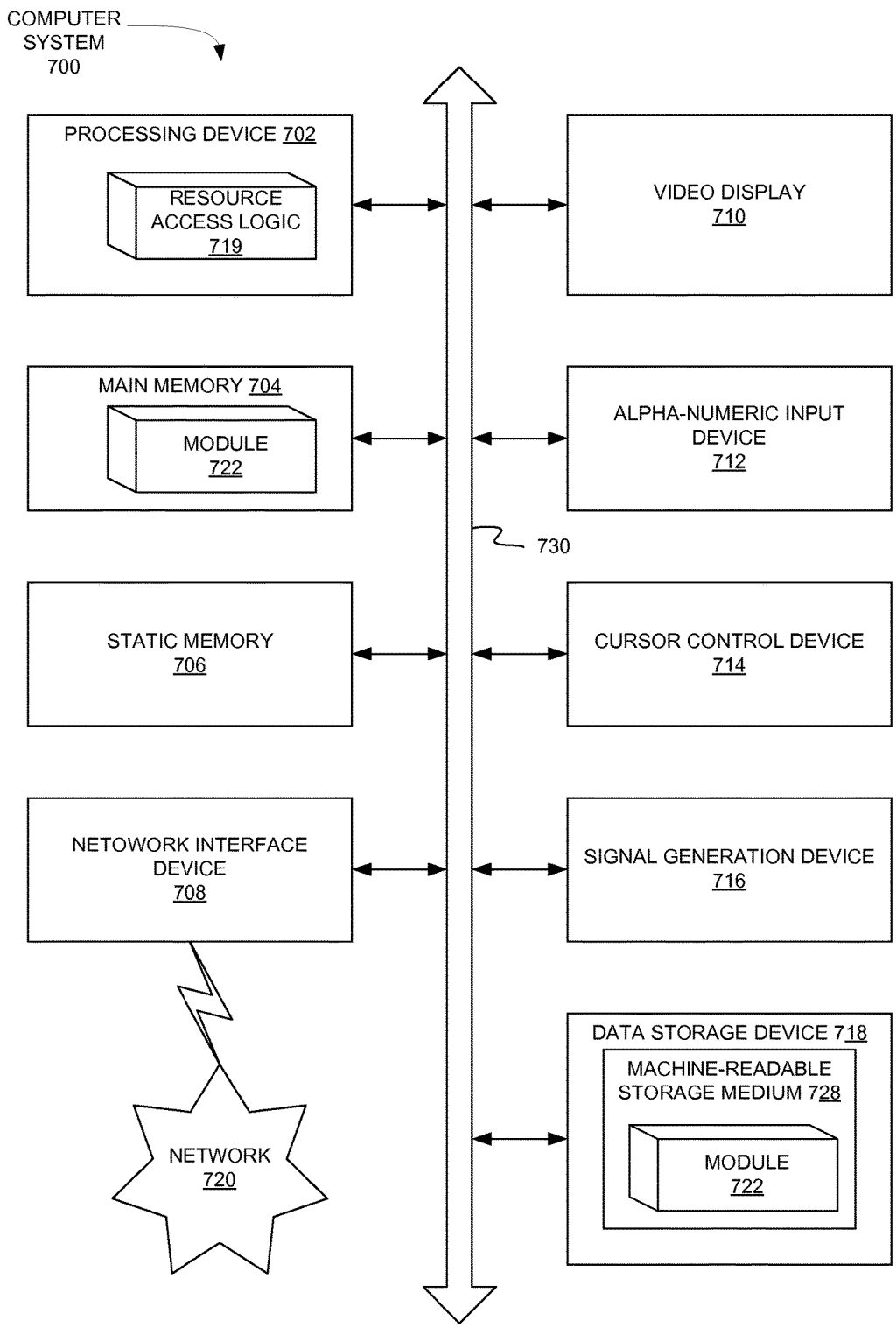
FIG. 7 is a block diagram of a service device in the example form of a computing device, according to an implementation.

FIG. 7 illustrates a diagrammatic representation of a server 102 in the example form of a computing device within which a set of instructions, for causing the machine to perform any one or more of the methodologies discussed herein, may be executed. The server 102 may be in the form of a computing device (e.g., a server computer) within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example server 102 includes a processing device 702, a main memory 704 (e.g., read-only memory (ROM), flash memory, dynamic random access memory (DRAM) such as synchronous DRAM (SDRAM)), a static memory 1006 (e.g., flash memory, static random access memory (SRAM)) and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute resource access logic 719 for performing the operations and steps discussed herein.

The server 102 may further include a network interface device 708 which may communicate with a network 720. The server 102 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker). In one embodiment, the video display unit 710, the alphanumeric input device 712, and the cursor control device 714 may be combined into a single component or device (e.g., an LCD touch screen).

In one embodiment, data storage device 718 may represent storage device 120. The data storage device 718 may include a computer-readable medium 728 on which is stored one or more sets of instructions (e.g., instructions of module 722, such as an identifier module or a data store module) embodying any one or more of the methodologies or functions described herein. The module 722 may (e.g., an identifier module or a data store module) also reside, completely or at least partially, within the main memory 704 and/or within the processing device 702 during execution thereof by the server 102, the main memory 704 and the processing device 702 also constituting computer-readable media. The instructions may further be transmitted or received over a network 720 via the network interface device 708.

While the computer-readable storage medium 728 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "restricting," "verifying," "performing," "denying," "determining," "sending," "allowing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of non-signal based media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving, by a processing device of a server, a migration request from a game client for migrating game data from a first video game account to a second video game account, wherein the migration request comprises a user identifier and a password;
    responsive to receiving the migration request:
        authenticating the migration request based on the user identifier and the password;
        migrating resource access data associated with the first video game account to the second video game account;
        restricting access to a distributed resource associated with the game data by activating a flag in a distributed resource check table to indicate that the distributed resource is blocked;
        generating a list of migration tasks to be completed for migrating the game data;
        issuing, based on the resource access data, an access token to the game client;
    responsive to receiving, from the game client, a game start request comprising the access token:
        authenticating the game client based on the access token;
        determining, based on the distributed resource check table, that the migration tasks are pending for the game client;
        migrating the game data by performing the migration tasks specified by the list of migration tasks;
        resetting the flag in the distributed resource check table to indicate that the distributed resource is unlocked;
    receiving a request from a distributed process to access the distributed resource; and
    responsive to determining that the distributed process has no pending tasks associated with the migration of the game data, allowing the distributed process to access to the distributed resource.

2. The method of claim 1, wherein the first video game account is an anonymous account and the second video game account is a user-identified video game account.

3. The method of claim 1, further comprising:
    responsive to determining that the distributed process has a pending task associated with the migration of the game data, denying the distributed process access to the distributed resource.

4. The method of claim 3, further comprising:
    allowing the distributed process to access the distributed resource after the pending task has been completed.

5. The method of claim 3, further comprising:
    sending an error message to the distributed process.

6. The method of claim 1, further comprising:
    responsive to determining that the distributed process has a pending task associated with the migration of the data, causing the distributed process to retry the request to access the distributed resource.

7. A non-transitory machine-readable storage medium storing instructions which, when executed, cause a processing device to perform operations comprising:
    receiving a migration request from a game client for migrating game data from a first video game account to a second video game account, wherein the migration request comprises a user identifier and a password;
    responsive to receiving the migration request:
        authenticating the migration request based on the user identifier and the password;
        migrating resource access data associated with the first video game account to the second video game account;
        restricting access to a distributed resource associated with the game data by activating a flag in a distributed resource check table to indicate that the distributed resource is blocked;
        generating a list of migration tasks to be completed for migrating the game data;

issuing, based on the resource access data, an access token to the game client;

responsive to receiving, from the game client, a game start request comprising the access token:
- authenticating the game client based on the access token;
- determining, based on the distributed resource check table, that the migration tasks are pending for the game client;
- migrating the game data by performing the migration tasks specified by the list of migration tasks;
- resetting the flag in the distributed resource check table to indicate that the distributed resource is unlocked;
- receiving a request from a distributed process to access the distributed resource; and
- responsive to determining that the distributed process has no pending tasks associated with the migration of the game data, allowing the distributed process to access to the distributed resource.

8. The non-transitory machine-readable storage medium of claim 7, wherein the first video game account is an anonymous account and the second video game account is a user-identified account.

9. The non-transitory machine-readable storage medium of claim 7, further comprising executable instructions causing the processing device to perform operations comprising:
- responsive to determining that the distributed process has a pending task associated with the migration of the game data, denying the distributed process access to the distributed resource.

10. The non-transitory machine-readable storage medium of claim 9, further comprising executable instructions causing the processing device to perform operations comprising:
- allowing the distributed process to access the distributed resource after the pending task has been completed.

11. The non-transitory machine-readable storage medium of claim 9, further comprising executable instructions causing the processing device to perform operations comprising:
- creating an empty distributed resource for a second distributed process that does not require access to the distributed resource; and
- creating a dependency for the second distributed process on the empty distributed resource.

12. The non-transitory machine-readable storage medium of claim 7, further comprising executable instructions causing the processing device to perform operations comprising:
- responsive to determining that the distributed process has a pending task associated with the migration of the data, causing the distributed process to retry the request to access the distributed resource.

13. An apparatus comprising:
- a memory to store a plurality of distributed resources and a distributed resource check table;
- a processing device, coupled to the memory, the processing device to:
  - receive a migration request from a game client for migrating game data from a first video game account to a second video game account, wherein the migration request comprises a user identifier and a password;
  - responsive to receiving the migration request:
    - authenticate the migration request based on the user identifier and the password;
    - migrate resource access data associated with the first video game account to the second video game account;
    - restrict access to a distributed resource associated with the game data by activating a flag in a distributed resource check table to indicate that the distributed resource is blocked;
    - generate a list of migration tasks to be completed for migrating the game data;
    - issue, based on the resource access data, an access token to the game client;
  - responsive to receiving, from the game client, a game start request comprising the access token:
    - authenticate the game client based on the access token;
    - determine, based on the distributed resource check table, that the migration tasks are pending for the game client;
    - migrate the game data by performing the migration tasks specified by the list of migration tasks;
    - reset the flag in the distributed resource check table to indicate that the distributed resource is unlocked;
    - receive a request from a distributed process to access the distributed resource; and
    - responsive to determining that the distributed process doesn't have any tasks associated with the migration of the game data, allow the distributed process to access to the distributed resource.

14. The apparatus of claim 13, wherein the first video game account is an anonymous account and the second video game account is a user-identified account.

15. The apparatus of claim 13, wherein the processing device is further to:
- responsive to determining that the distributed process has a pending task associated with the migration of the game data, deny the distributed process access to the distributed resource.

16. The apparatus of claim 15, wherein the processing device is to allow the distributed process to access the distributed resource after the pending task has been completed.

17. The apparatus of claim 13, wherein the processing device is further to:
- responsive to determining that the distributed process has a pending task associated with the migration of the data, cause the distributed process to retry the request to access the distributed resource.

* * * * *